UNITED STATES PATENT OFFICE.

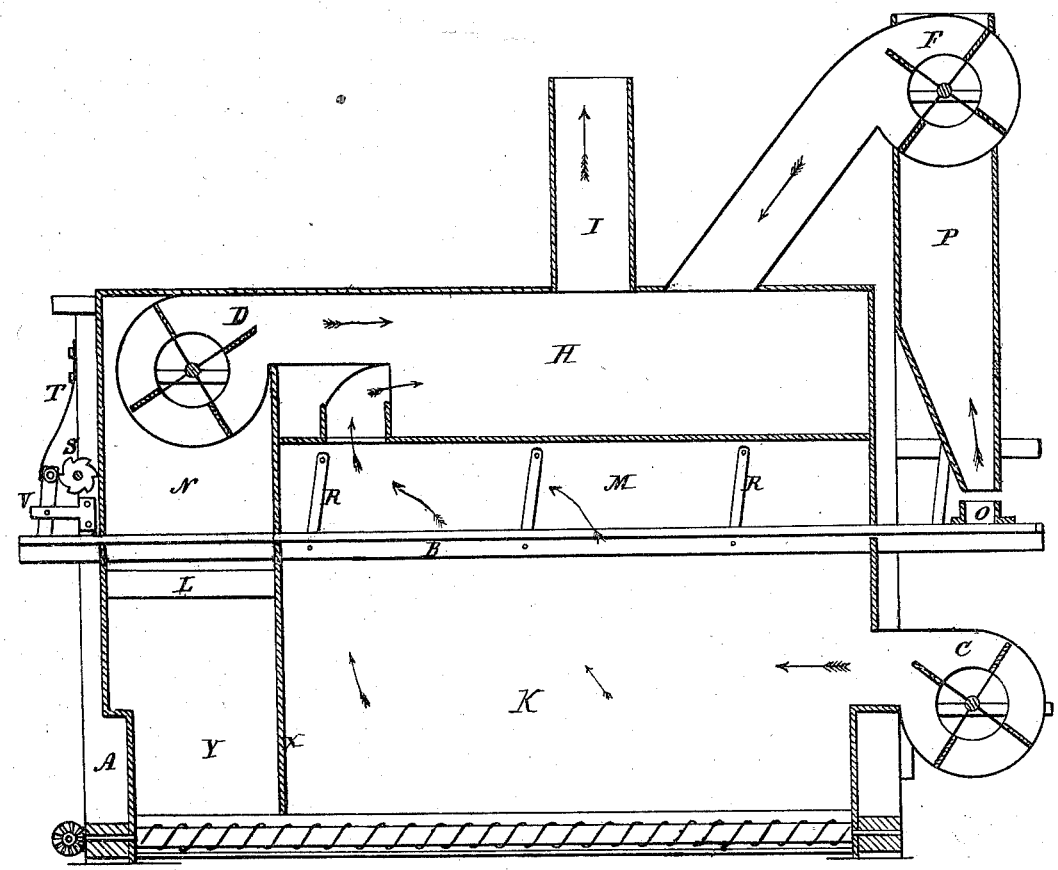

ANDREW HUNTER AND CHARLES E. WHITMORE, OF QUINCY, ILLINOIS.

IMPROVEMENT IN MIDDLINGS-PURIFIERS.

Specification forming part of Letters Patent No. 142,022, dated August 19, 1873; application filed July 2, 1873.

*To all whom it may concern:*

Be it known that we, ANDREW HUNTER and CHARLES EDWARD WHITMORE, of Quincy, county of Adams, State of Illinois, have invented a new and useful Improvement in Middlings-Purifiers, of which the following is a full, clear, and exact description reference being had to the accompanying drawing making part of this specification, which represents a longitudinal vertical section through the machine, showing the interior arrangement, with the screen-supporting links, the ratchet-wheel and lever, and the fans; also, the direction of the currents of air, &c.

Our invention consists in combining, in one middlings - purifying machine, a suction, a blast, and a suction-fan, each operating in a compartment separate from the other, as and for a purpose as follows: The first fan operates on the middlings as they are discharged from the bolting-reel; the object of the fan being to remove the moisture and cool the middlings before entering the compartment when the blast or second fan is used. The blast-fan removes the fine fuzzy particles and light brown specks from the middlings as they are sifted through the bolting-cloth. The object of the blast is for forcing a light current of air up through the middlings, thereby removing nothing but the worthless therefrom. The middlings or tailings as they pass into the third compartment are acted on by the second suction-fan, where a heavy current is required on account of the coarseness of the material, and by means of which the coarse brown particles are removed without any loss of the valuable material.

A is the frame of the machine. B is a screen-frame, covered with wire and bolting-cloth. C is a blast-fan that operates on the middlings, covering the screen in compartment M. The wind passes out into dust-chamber H. D is a suction-fan that operates on the tailings on screen in compartment N, and discharges into dust-chamber H. F is a suction-fan, that operates on the middlings as they are discharged into tube P. The object of the suction-fan is to remove the moisture and dampness from the middlings before passing onto the bolting-cloth. H is a dust-chamber. I is an air-tube. M is a compartment over screen B, into which the wind from fan C passes. N is a second compartment, that the wind drawn into fan D passes through. O is a feed-trough; P, a tube for receiving the middlings; S, cam or ratchet wheel; T, springs for keeping the levers in contact with the cam-wheels. V are straps for pivoting the levers. K is a receptacle for the pure middlings to fall into. X is a partition-board for separating the current of air between fans C and D. L is an opning for the wind to enter for fan D.

The operation of our improved machine may be described as follows: The machine being set in motion, the middlings to be purified are fed into tube P, from there are discharged into trough O, and are evenly spread on screen B. The fan F draws a current of air through the openings at the bottom of tube P, and discharges into dust-box H, as shown by the arrows. The fan C forces a current of air up through the screen into compartment M. The suction-fan D receives the air through the openings L, and discharges into box H. The air-tube I carries off the wind and dust into a proper receptacle.

The object of the above-described arrangement of these fans is to bring within the compass of a single organized machine what is now performed by operations involving three distinct and separate machines, and thereby to accomplish a perfect separation of all impurities from the middlings at a greatly-reduced expense.

We do not claim the combination of a suction and blast fan arranged in separate chambers, as the same forms the subject of a separate application filed by us; but What we do claim is—

In a machine for purifying middlings, the two suction-fans and a blast-fan, combined with a screen and feed-tube, the fans operating in distinct and separate compartments, and independently of each other, substantially as set forth.

In testimony whereof we have hereunto set our hands this 26th day of June, A. D. 1873.

ANDREW HUNTER.
 CHARLES EDWARD WHITMORE.

Witnesses:
 THOS. E. DURANT,
 WALTER SCOGGAN.